Nov. 26, 1968 K. GÖSELE 3,412,513

PLATE-LIKE SOUND-ABSORBING STRUCTURAL ELEMENT PREFERABLY HAVING TWO OUTER PLATE-SHAPED MEMBERS

Filed March 30, 1965 6 Sheets-Sheet 1

INVENTOR
KARL GÖSELE
BY Lowry & Rinehart
attys.

Nov. 26, 1968 K. GÖSELE 3,412,513

PLATE-LIKE SOUND-ABSORBING STRUCTURAL ELEMENT PREFERABLY HAVING TWO OUTER PLATE-SHAPED MEMBERS

Filed March 30, 1965 6 Sheets-Sheet 2

INVENTOR
KARL GÖSELE
BY Lowry & Rinehart
attys.

INVENTOR
KARL GÖSELE
BY Lowry & Rinehart
attys.

Nov. 26, 1968 K. GÖSELE 3,412,513

PLATE-LIKE SOUND-ABSORBING STRUCTURAL ELEMENT PREFERABLY HAVING TWO OUTER PLATE-SHAPED MEMBERS

Filed March 30, 1965 6 Sheets-Sheet 4

INVENTOR
KARL GÖSELE
BY Lowry & Rinehart
attys.

INVENTOR
KARL GÖSELE
BY Lowry & Rinehart
attys

INVENTOR
KARL GÖSELE
BY Lowry & Rinehart
attys 3,412,513

PLATE-LIKE SOUND-ABSORBING STRUCTURAL ELEMENT PREFERABLY HAVING TWO OUTER PLATE-SHAPED MEMBERS

Karl Gosele, Stetten auf den Fildern, Germany, assignor to Fraunhofer-Gesellschaft zur Forderung der angewandten Forschung e.V., Munich, Germany Filed Mar. 30, 1965, Ser. No. 443,816
Claims priority, application Austria, Mar. 31, 1964, A 2,769/64
5 Claims. (Cl. 52—303)

ABSTRACT OF THE DISCLOSURE

A sound-absorbing structural element including two outer plate-shaped members, a sheet of sound absorbing material between the plate-shaped members, a plurality of hollow spaces between at least one of the outer plate-shaped members and the sheet of sound absorbing material, and the hollow spaces being filled with a heavy bulk material such as sand, chipped stone, or the like.

This invention relates to structural elements, and more specifically to a plate-like sound-absorbing structural element which has two outer plate-shaped members, or an already existent wall or the like with two outer plate-shaped members, such as, e.g., a partition wall or a protective wall, a leaf of a door, a suspended ceiling, a sound-absorbing hood for machines, instruments or the like, and in which a filler of specifically heavy bulk material such as sand, stone chippings or the like and a sound-absorbing layer of small stiffness are provided between the outer plate-shaped members.

With structural elements of this type favorable sound-absorption characteristics can be obtained. However, the manufacture of such structural elements is difficult because the bulk material located between the outer plate-shaped members and the sound-absorbing layer exerts considerable pressure on the plate-shaped members whereby, e.g., a wall or door becomes bulged. Furthermore, such structural elements involve the disadvantage that in the event of damage to the outer plate-shaped member, e.g., when laying an electric cable, when mounting a washing basin or the like, the bulk material may flow out of the structural element without hindrance. Finally, some structural elements are composed of individual prefabricated partial elements, e.g., wall panels corresponding in height to the height between two floors, in which case the transporting weight of the individual partial elements is to be kept as low as possible. When using an acoustically sufficient filling of sand, the transporting weights frequently become too high.

*Summary of the invention*

It is the object of the present invention to provide sound-absorbing structural elements of the type specified at the outset, in which the above-mentioned disadvantages are avoided.

This object is achieved according to the invention by providing a plate-like sound-absorbing structural element preferably having two outer plate-shaped members, such as a partition wall, protective wall, suspended ceiling, leaf of a door, sound-absorbing hood for machines, instruments or the like, with a filler of specifically heavy bulk material such as sand, stone chippings or the like and a sound-absorbing layer, wherein the bulk material is accommodated in individual separate inherently stable hollow spaces between at least one outer plate-shaped member of the structural element and the sound-absorbing layer, and is directly adjacent the inner side of the outer plate-shaped member of the structural element, on the one hand, and the sound-absorbing layer, on the other hand, or separated from the outer plate-shaped member and/or the sound-absorbing layer only by a thin layer having no acoustic effect, such as a foil.

The bulk material may be filled in during the mounting of the structural element or its individual elements at the works or only at the site of installation, i.e., after the transport.

The sound-damping action and the increase in weight of the outer plate-shaped members caused by the bulk material are so great that the structure of such structural elements involving two outer plate-shaped members still has an acoustic effect when the two plate-shaped members are firmly connected together by means of common frames or other parts acting as sound bridges. This advantageous effect is, however, according to the invention fully existent only when the outer plate-shaped members are not additionally stiffened by the necessary mounting for the filler. This is achieved by the invention in a simple manner in that the filler, as already mentioned, is directly adjacent the outer plate-shaped member or members, on the one hand, and the sound-absorbing layer of the structural element, on the other hand, or separated from the outer plate-shaped member or members and/or the sound-absorbing layer only by a thin cardboard, foil or the like.

In practice, the necessary hollow spaces for the bulk material may be produced by a certain sectioning of the outer sides of the sound-absorbing layer or the inner sides of the outer plate-shaped members of the structural element. According to a further solution proposed by the invention claimed, the hollow spaces are produced by mat type or plate-like structures of plastics foils, cardboards or the like provided with depressions, which structures are affixed, e.g., glued to the inner side of the outer plate-shaped members of the structural element.

*Brief description of drawings*

Several embodiments of the invention will now be described by way of example and with reference to the accompanying drawings, in which.

*Description of specific embodiments*

Figures 1, 1A, 2:
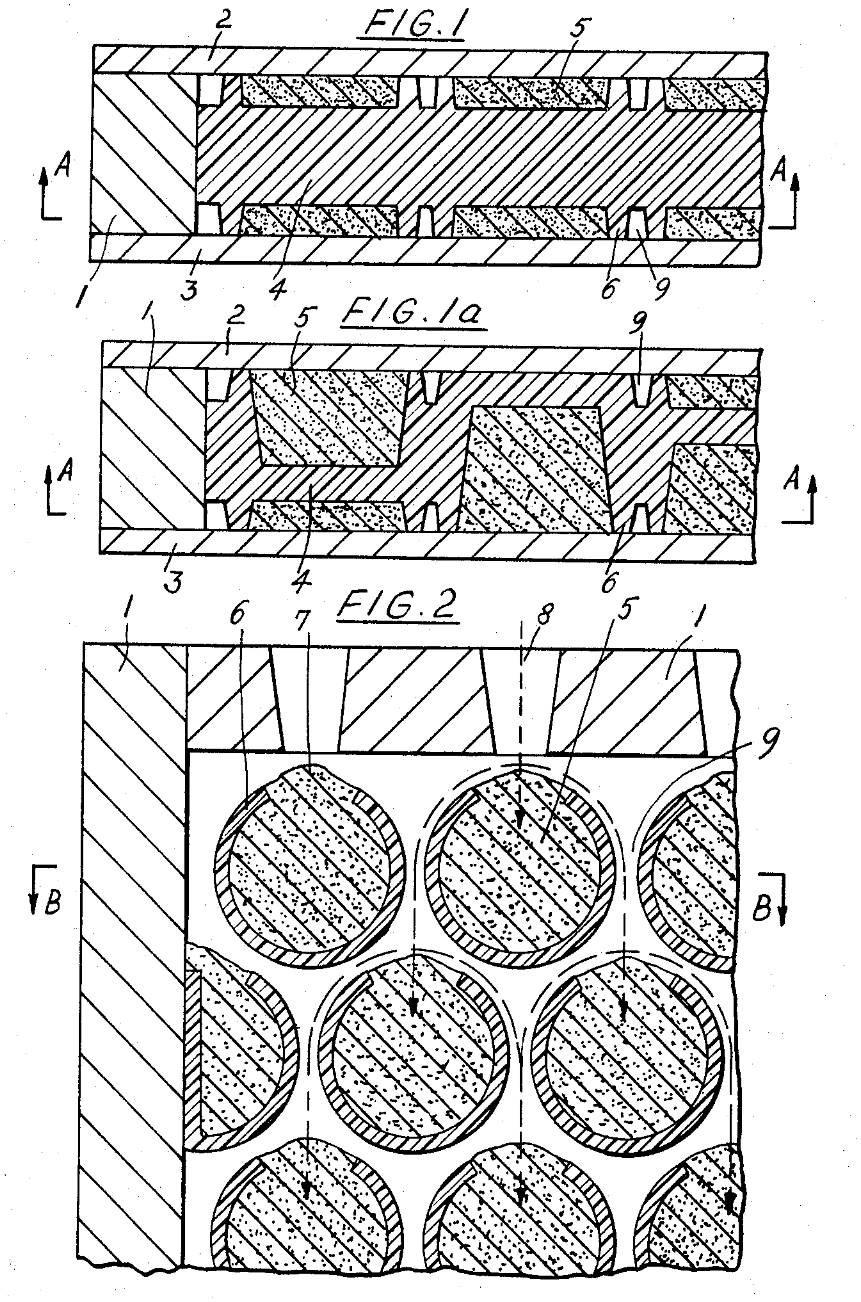
FIG. 1 is a horizontal section through a partition wall element according to the invention taken on the line B—B of FIG. 2.
FIG. 1*a* is a similar view of a modified partition wall element.
FIG. 2 is a vertical section through the partition wall element of FIG. 1 taken on the line A—A of FIG 1.

FIGS. 1 and 2 show a partition wall element including a circumferential frame 1 which connects two outer plate-shaped members 2 and 3 of the wall element. In the hollow space between the plate-shaped members 2 and 3 there is located a sound-absorbing layer 4 which has separate pocket-like hollow spaces 5 filled with bulk material. The sound-absorbing layer 4 is connected to the plate-shaped members 2 and 3, e.g. by gluing. The pocket-like hollow spaces 5 are defined by the sound-absorbing layer 4 and the adjoining plate-shaped wall member as well as by a wall 6 projecting from the sound-absorbing layer and having an opening 7 in its upper portion. The hollow spaces 5 can be filled with bulk material through filling holes 8 provided in the frame 1, supply passages 9 and the openings 7 in the walls 6 of the hollow spaces. The supply passages 9 are defined by the outer plate-shaped members 2 and 3, respectively, the sound-absorbing layer 4 and the walls 6 of the hollow spaces 5. The hollow spaces 5 are staggered relative to one another so that the lower positioned hollow spaces will be filled with bulk material as soon as the row of hollow spaces positioned thereabove has been filled. In FIG. 2 the paths of the bulk material to be filled in have been indicated in dash lines. The individual hollow spaces 5 are, as a rule, of equal dimensions, as shown in FIG. 1. In special cases it may, however, be expedient to provide the individual hollow spaces 5 with different dimensions, above all with different depths, as, e.g., shown in FIG. 1*a*, so that the thickness of the layer of bulk material varies in order to obtain sufficient absorption of the vibrations of the outer plate-shaped members in a wide frequency range. Namely, as is known, layers of sand have a great absorption effect only when they perform natural vibrations. The frequency of these natural vibrations depends on the dimensions, above all on the thickness of the layer of sand. In some cases different frequency ranges are to be attenuated, for which purpose different thicknesses of the layers of sand can then be selected.

Figures 3, 4, 5, 6:
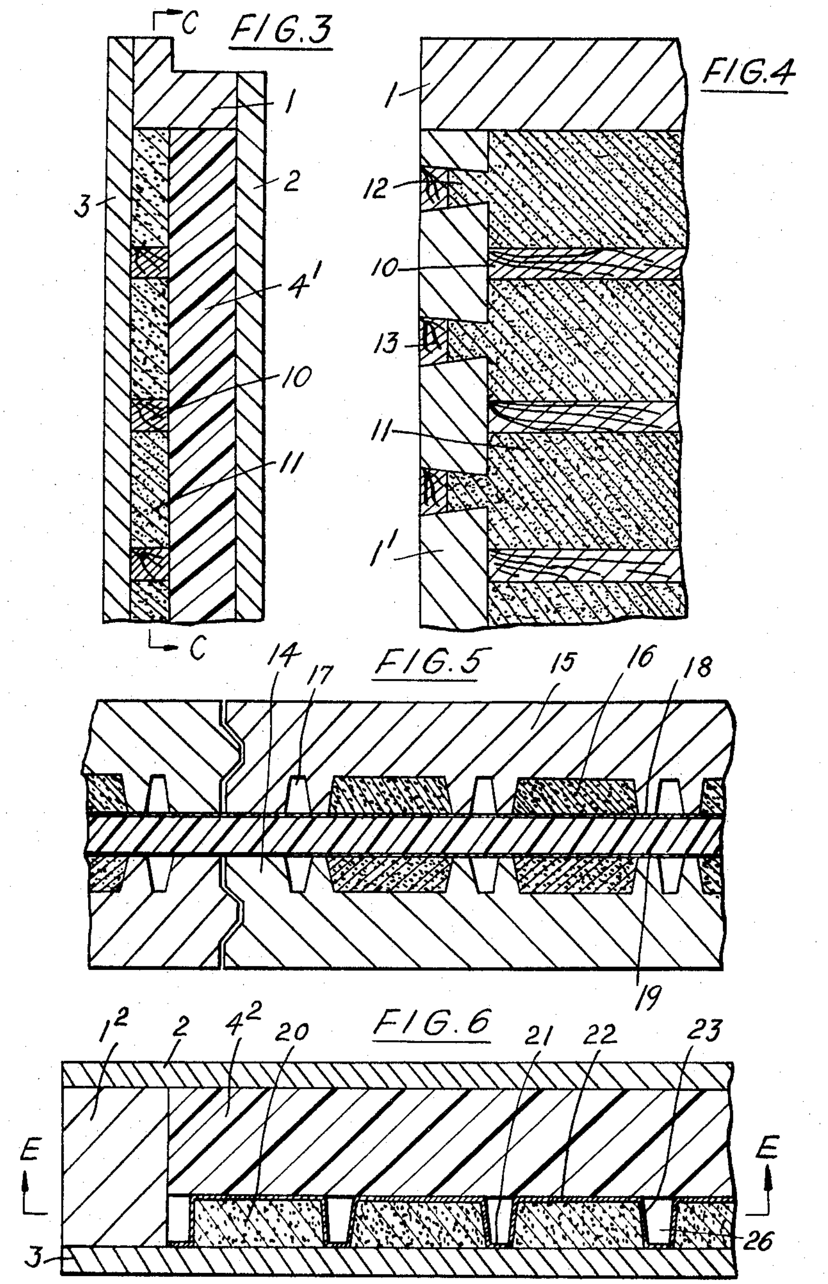
FIG. 3 is a vertical section through the leaf of a door according to the invention.
FIG. 4 is another vertical section through the leaf of FIG. 3 taken on the line C—C of FIG. 3.
FIG. 5 is a horizontal section through a double wall according to the invention.
FIG. 6 is a horizontal section through another wall element according to the invention taken on the line D—D of FIG. 7.

FIGS. 3 and 4 show the leaf of a door in which the outer plate-shaped members 2 and 3 are again connected by means of a frame 1. In the space between the outer plate-shaped members 2 and 3 there is arranged a plate-shaped sound-absorbing layer 4$^1$ which is provided with individual horizontally extending webs 10 forming elongated trough-shaped horizontally extending hollow spaces 11 between the sound-absorbing layer 4$^1$ and the plate-shaped member 3 of the leaf of the door. These hollow spaces 11 can be filled with bulk material through openings 12 provided laterally in a frame 1$^1$. When the leaf of the door has been filled, the openings 12 will be closed by stoppers 13 or by a covering strip of wood or the like.

In FIG. 3 the bulk material is provided at the side of one of the two outer plate-shaped members only; it may, however, also be provided in a similar manner at the side of the other outer plate-shaped member.

FIG. 5 shows a double wall including completely separate rigid outer plate-shaped members composed of individual plates 14 and 15, e.g., of plaster of Paris. On their inner sides these wall plates 14 and 15 are profiled in a corresponding manner and, like the sound-absorbing layer of FIGS. 1 and 2, provided with pocket-like hollow spaces 16 filled with bulk material. Filling is again performed from the upper edge of the plates through holes not specially shown and supply passages 17. The hollow spaces 16 and the supply passages 17 are sealed from a sound-absorbing layer 19 by means of a pasted-on cardboard 18. The sound-absorbing layer 19 is located between the plate-shaped members. The individual plates on each side of the double wall are connected together, e.g., by a tongue-and-groove connection.

Figure 7:
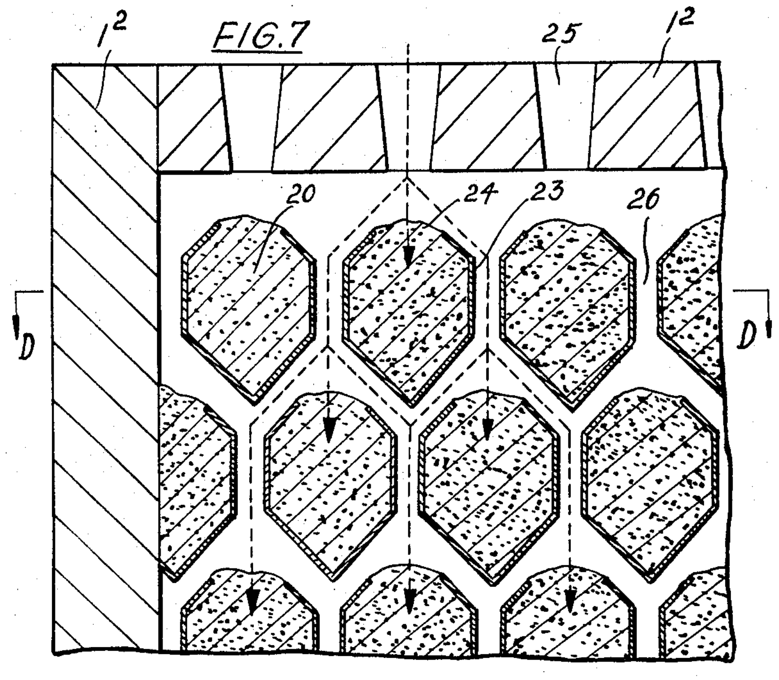
FIG. 7 is a vertical section through the wall element of FIG. 6 taken on the line E—E of FIG. 6.
Figures 8, 11, 12, 13, 14:
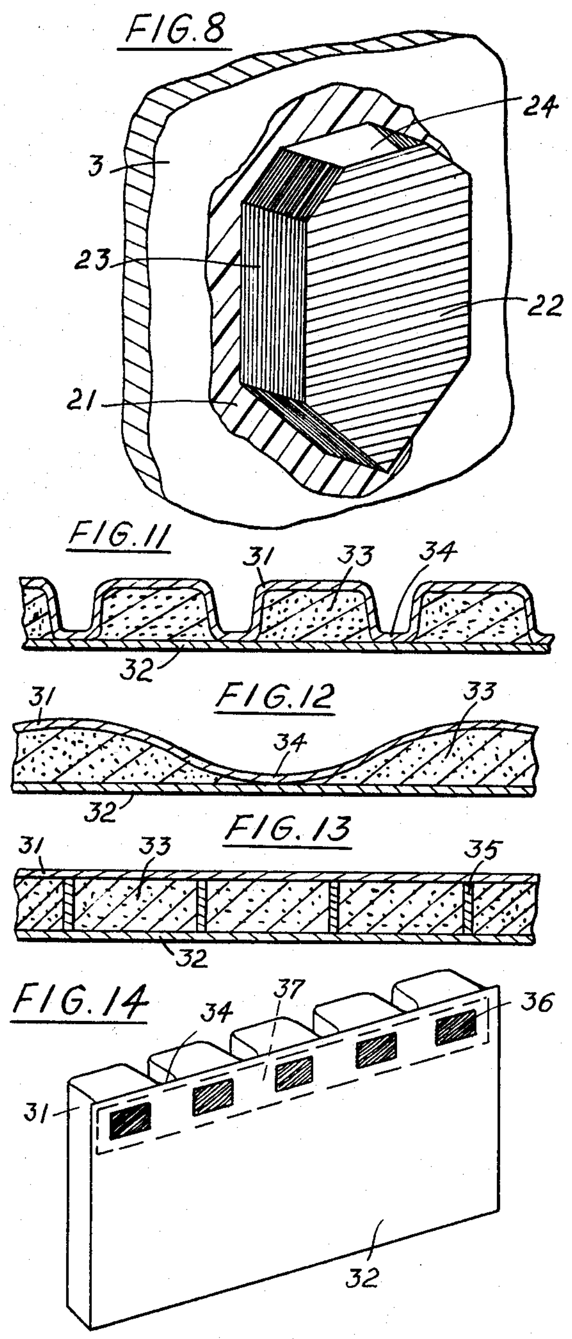
FIG. 8 is a perspective view of a detail of the embodiment of FIGS. 6 and 7.
FIGS. 11 to 13 are sections through sound-absorbing elements forming hollow spaces.
FIG. 14 is a perspective view of a wall element with filling holes for the supply of the bulk material.

FIGS. 6 and 7 show another possibility of providing hollow spaces filled with bulk material between one of two outer plate-shaped members of a wall and the sound-absorbing layer. The outer plate-shaped members 2 and 3 comprising, e.g., plywood plates are connected by means of a frame 1$^2$. In the hollow space of the wall there is located a sound-absorbing layer 4$^2$. Hollow spaces 20 filled with bulk material are formed by a foil 21 of synthetic plastics material having depressions of hexagonal cross section embossed therein. FIG. 8 is an isometric view of such a depression. Each depression has a bottom 22 forming the rear side of the hollow space which is further defined by the outer plate-shaped member 3 and the narrow sides 23 of the depression. At the upper side of the depression there is provided an opening 24 through which the bulk material can be fed into the hollow spaces with the aid of filling holes 25 in the frame 1$^2$ and supply passages 26. The vertically staggered hollow spaces 20 will be filled with bulk material flowing along the paths indicated in dash lines in FIG. 7, as soon as the row of hollow spaces positioned thereabove has been filled.

Figure 9:
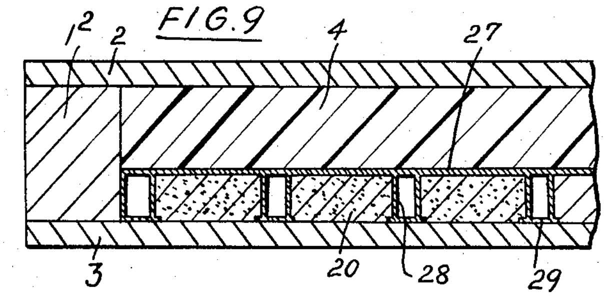
FIGS. 9 and 10 are sections through further wall elements according to the invention.

Instead of producing the hollow spaces from an embossed or otherwise deformed foil of synthetic plastics material it is also possible to make the hollow spaces from individual parts by gluing same together, for which purpose, e.g., also cardboard may be used. This possibility is shown in FIG. 9. The hollow spaces 20 are formed in this case by a plane cardboard 27 to which strips of cardboard 28 extending perpendicularly thereto are glued, with strips—substantially as shown in FIG. 7—define the form of a hexagon with the opening 24. For better attachment to the plate-shaped member 3 these strips of cardboard 28 have a second plane cardboard 29 connected thereto into which holes may be punched to render possible direct contact between the plate-shaped member 3 of the wall and the bulk material.

A further development of the inventive idea consists in that the hollow spaces for the bulk material may also be produced by mat type or plate-like flexible sound-absorbing elements consisting of two flexible webs of a material such as cardboard, plastics, a fabric of organic or inorganic fibres or the like, said webs being subdivided into individual hollow spaces to be filled with bulk material by groove-like or wave trough-like depressions which may cross each other, if desired, or by strip-shaped spacers between the two walls.

Figure 10:
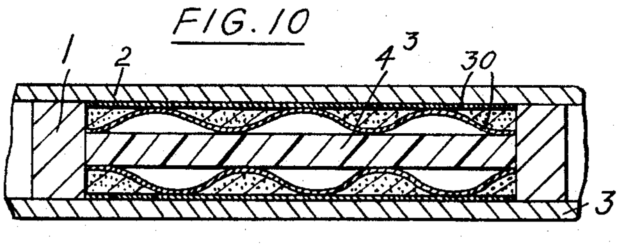

FIG. 10 shows the arrangement of mats in a wall element having two outer plate-shaped members. In this arrangement the mats filled with bulk material are designated by reference numeral 30 and the sound-absorbing layer is designated by reference numeral 4$^3$. FIGS. 11 to 13 represent cross-sectional views of such sound-absorbing elements.

In FIG. 11 the sound-absorbing element consists of two sheathings 31 and 32 of which the upper sheathing 31 is folded in meander fashion so that substantially trapezoidal channels 33 are formed which are separated from each other by narrow strips 34 of the sheathing 31. The connection between the sheathings 31 and 32 may be effected, e.g., by welding if the sheathings are made of plastics or by gluing if the sheathings consist of cardboard, whereas textile fabrics can be sewn, glued or also welded if the fabric consists of weldable plastics threads. The tubes formed between the two sheathings 31 and 32 are filled with bulk material and closed at their end faces. Such a sound-absorbing element can be readily separated into desired sections by cutting along the strips 34 of the sheathing.

It is possible to form the upper sheathing 31 also in such a manner that a pattern of grooves crossing each other is produced whereby the bulk material filled in is confined to still smaller partial spaces having the form of a truncated pyramid.

FIG. 12 shows a sound-absorbing element in which the upper sheathing 31 extends in wave fashion and the strips 34 of the sheathing 31 are firmly connected with the lower sheathing 32. This results in a sound-absorbing element of corrugated cardboard type structure the hollow spaces 33 of which formed by the corrugation crests of the upper sheathing 31 together with the lower sheathing 32 or, if corrugation troughs crossing each other are existent, the pad-like spaces of which are filled with bulk material. Also this sound-absorbing element may be separated into appropriate pieces by cutting along the strips.

FIG. 13 shows a sound-absorbing element in which the two sheathings 31 and 32 are kept a distance apart by a plurality of spacing webs 35, and the hollow space of the sound-absorbing element filled with bulk material is subdivided by these spacing webs into corresponding strip-shaped sections or, if spacing webs crossing each other are provided, into square sections. For filling sound-absorbing elements as shown, e.g., in FIG. 11, appropriate openings 36 may be provided in the upper region of the sound-absorbing element, as shown in FIG. 14. These openings 36 will be closed by an adhesive tape 37 after the associated trapezoidal tubes formed by the creased sheathing 31 have been filled.

In the following some typical examples of use of the invention will be described by reference to FIGS. 15 to 22.

Figures 15, 16, 17, 18, 19:
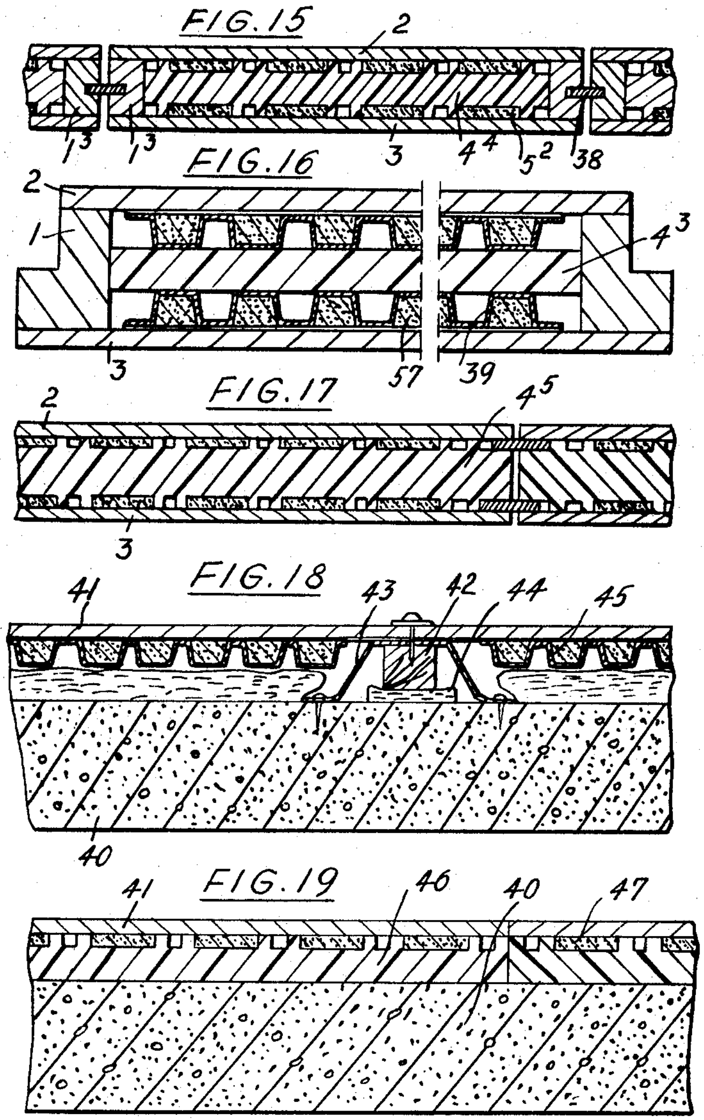
FIGS. 15 to 20 are sections through different structural elements according to the invention.

FIG. 15 shows a partition wall of individual panels corresponding in height to the height between two floors and connected together by means of keys 38. Reference numerals 2 and 3 designate the outer plate-shaped members of the panel connected by a frame $\mathbf{1^3}$. Between the outer plate-shaped members 2 and 3 a sound-absorbing plate $\mathbf{4^4}$ is glued which is provided with hollow spaces of the type shown in FIG. 2 which are filled with bulk material $\mathbf{5^2}$ from the upper edge of the panel.

FIG. 16 shows a leaf of a door having two outer plate-shaped members to the inner sides of which sound-absorbing elements 39 of the type shown in FIG. 11 and having a sand filling 57 are secured.

FIG. 17 shows a partition wall composed of panels of sandwich construction. Reference numerals 2 and 3 again designate the two outer plate-shaped members comprising e.g. plates of plaster of Paris, wood waste panels or the like which are firmly glued together through the intermediary of sound-absorbing plates $\mathbf{4^5}$ as shown in FIG. 2 and consisting e.g. of foamed plastics. For increasing the stability, individual point-shaped or linear fixed spacers consisting e.g. of wood or metal may be interposed between the outer plate-shaped members.

Figure 20:
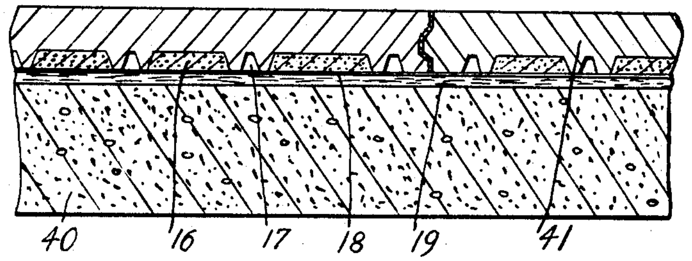

Three possibilities of improving the sound absorption of a partition wall 40 by a single protective outer plate-shaped member 41 are illustrated in FIGS. 18 to 20. In FIG. 18 the wall 40 has through the intermediary of U-shaped spring members 43 and sound-absorbing strips 44 individual pieces of wood 42 secured thereto to which the outer plate-shaped member 41 comprising e.g. plates of plaster of Paris, wood waste panels or the like is affixed. On the side of the outer plate-shaped member 41 facing the wall 40 there are secured sound-absorbing elements 45 of the type shown in FIGS. 7, 9 and 11 which are filled with bulk material.

In the embodiment shown in FIG. 19 the wall 40 has panels glued thereto which comprise an outer plate-shaped member 41, e.g. plates of plaster of Paris, and a sound-absorbing layer 46 firmly connected thereto. The sound-absorbing layer 46 has individual hollow spaces 47 of the type as e.g. shown in FIG. 2 which are filled with bulk material.

FIG. 20 shows a wall lining composed of thick rigid plates 41 consisting e.g. of plaster of Paris. The plates 41 are provided with hollow spaces 16 closed by a foil 18. Reference numeral 19 designates a sound-absorbing layer of mineral fibres and reference numeral 17 the supply passage for the bulk material.

Figures 21, 22, 23:
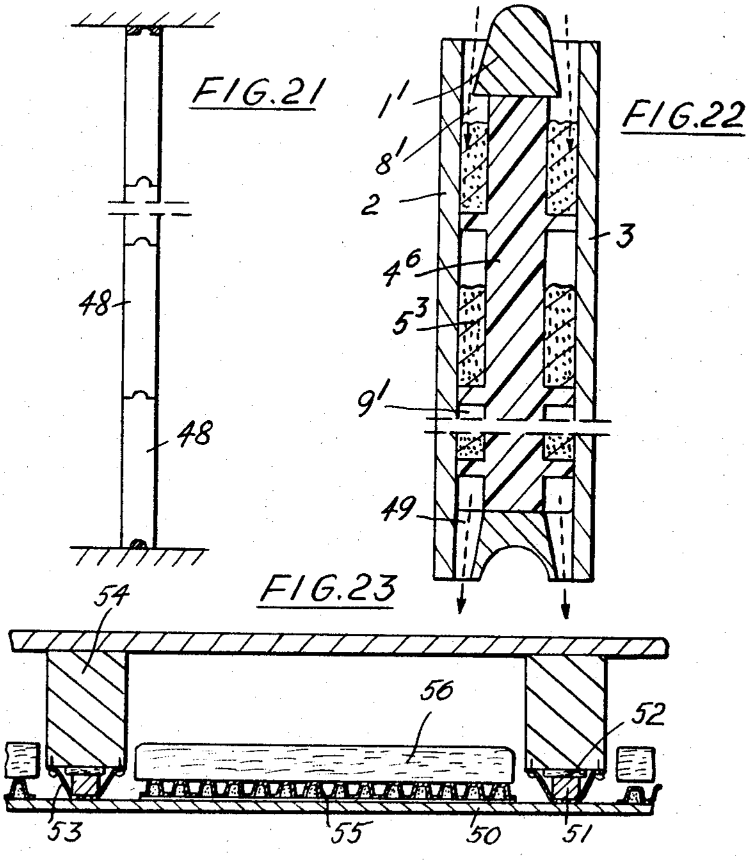
FIG. 21 is a schematic side elevation view of a partition wall according to the invention.
FIG. 22 is a section through the partition wall of FIG. 21.
FIG. 23 is a section through a wood joist ceiling according to the invention.

FIG. 21 shows the construction of a partition wall of individual plates 48 consisting, e.g., of plaster of Paris. FIG. 22 is a vertical section through one of such plates, reference numerals 2 and 3 designating the two outer plate-shaped members and reference numeral $\mathbf{1^1}$ the circumferential frame of plaster of Paris. In the hollow space of the wall there is located a sound-absorbing plate $\mathbf{4^6}$ which has hollow spaces $\mathbf{5^3}$ of the type shown in FIGS. 1 and 2 which can be filled with bulk material through filling holes $\mathbf{8^1}$ in the frame $\mathbf{1^1}$ and supply passages $\mathbf{9^1}$. To be able to fill the partition wall with bulk material after the erection of the entire partition wall, except for a small ceiling engaging fitting piece at the upper edge, each plate 48 has at its lower edge discharge openings 49 through which the next plate positioned therebelow will be automatically filled after having filled the respective upper plate.

FIG. 23 shows a wood joist ceiling according to the invention in which flexible plates 50, e.g., wood waste panels, plates of plaster of Paris or the like, are secured by means of U-shaped spring members 53 to the ceiling joists 54 through the intermediary of wooden bars 51 and sound-absorbing strips 52. On the inner side of the plates 50 there are positioned sound-absorbing elements 55 of the type shown in FIGS. 11 to 13 and above these sound-absorbing elements a fibre mat 56 is located.

It is understood that the illustrated embodiments may be modified in various ways without departing from the scope of the invention.

I claim:

1. A sound absorbing structural element comprising:

(a) two outer plate shaped members, (b) a sheet of sound absorbing material between the plate shaped members, (c) pocket means forming a plurality of individual, spatially separated hollow spaces between at least one of the outer plate shaped members and the sheet of sound absorbing material, (d) means defining openings located on one edge of said element to supply a heavy bulk material to said pocket means, (e) means defining an opening located on corresponding sides of each of said pocket means to open said spaces in a direction toward the said element opening means to introduce a heavy bulk material into said hollow spaces, and (f) a heavy bulk material of individual particles located in said hollow spaces and filling all of said hollow spaces to increase the sound damping action and to provide additional weight to the element.

2. A sound absorbing structural element as defined in claim 1 wherein the said pocket means include a wall structure juxtaposed to at least one of the outer plate shaped members to define depressions which form the plurality of hollow spaces.

3. A sound absorbing structural element as defined in claim 1 wherein the said pocket means include depressions formed in the sheet of sound absorbing material.

4. A sound absorbing structural element as defined in claim 3 wherein the depressions have a characteristic shape having a small vertical dimension and located in vertically superimposed rows across the sheet of sound absorbing material.

5. A sound absorbing structural element as defined in claim 4 wherein the depressions in adjacent vertically superimposed rows are staggered with respect to each other.

References Cited

UNITED STATES PATENTS

| | | | |
|---|---|---|---|
| 1,912,631 | 6/1933 | Gibson | 52—615 |
| 2,039,601 | 5/1936 | London | 52—618 |
| 2,164,138 | 6/1939 | London | 52—407 |
| 2,330,941 | 10/1943 | Acuff | 52—406 |
| 2,479,870 | 8/1949 | Rundquist | 52—615 |
| 2,669,860 | 2/1954 | Bell | 52—615 |

| | | | |
|---|---|---|---|
| 836,017 | 11/1906 | Douglass | 52—303 |
| 2,910,396 | 10/1959 | Randall | 52—576 |
| 3,000,144 | 9/1961 | Kitson | 52—309 |

FOREIGN PATENTS

| | | |
|---|---|---|
| 994,803 | 8/1951 | France. |
| 427,320 | 4/1935 | Great Britain. |
| 665,387 | 4/1936 | Germany. |
| 255,745 | 3/1964 | Netherlands. |

HENRY C. SUTHERLAND, *Primary Examiner.*

J. L. RIDGILL, *Assistant Examiner.*